Oct. 18, 1927.
F. S. BERNHARD
1,645,850
REGULATOR
Filed Nov. 22, 1923
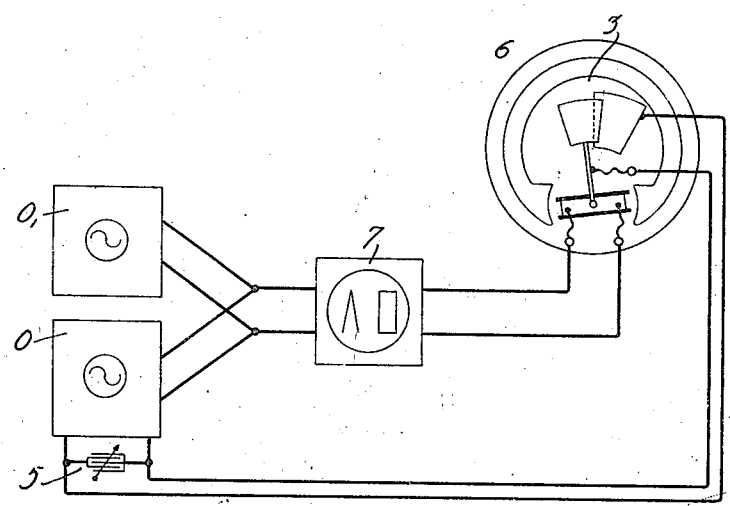
Inventor
Frederick S. Bernhard
by E.W. Adams Att'y Patented Oct. 18, 1927.

1,645,850

UNITED STATES PATENT OFFICE.

FREDERICK S. BERNHARD, OF BROOKLYN, NEW YORK, ASSIGNOR TO WESTERN ELECTRIC COMPANY, INCORPORATED, OF NEW YORK, N. Y., A CORPORATION OF NEW YORK.

REGULATOR.

Application filed November 22, 1923. Serial No. 676,456.

This invention relates to a regulator and particularly to means for automatically regulating the output product of an energy translating device such as, for example, an oscillation generator.

An energy translating device, as used herein, is any combination of elements cooperating in such manner as to transfer energy from one part, of a system which includes such device, the input, to another part, the output. Transfer may be attended, for example, by a change from one form of energy to another as in a generator or motor, an absorption of energy resulting in a change in energy content, as in an electric transmission circuit containing resistance, or a change in proportion of its component parts as in a potential transformer. Translation of energy may be accomplished by no change whatever in the form of the energy as in midterminal sections of a resistanceless filter. A change in the product of a translation device will be understood as a change with respect to any of the characteristics that energy may have, examples of which are given above.

An object of the invention is to regulate the product of a translating device with respect to a predetermined standard.

A second object of the invention is to provide improvements in means whereby any variation of characteristic of the output energy of a translating device with respect to a similar characteristic of the output of a reference translating device automatically effects a compensating variation tending to restore the variation frequencies of the two characteristics to an initial relation, which may be that of equality or of other rational fractional relation.

Another object is to provide means whereby a variation of the frequency of an oscillator relative to the frequency of a reference standard effects a compensating variation in one oscillator tending to restore the frequency of the oscillator to its initial relative frequency.

Specific objects are: to regulate the frequency of an electric oscillator with respect to an arbitrary frequency standard; to provide automatic restoring means effective when and in proportion as the frequency departs from said standard; to maintain the periodically varying currents of an alternating current source in isochronous and synchronous relation with a periodically varying product from an independent energy source; and to maintain isochronism or synchronism between the alternating currents supplied from two independent sources by providing automatic restoring means effective when, and in proportion as, one current departs from its initial condition relative to the other.

The words "synchronism" and "isochronism" are used here and hereinafter in a broad sense, so as to apply, for example, to two frequencies which have a rational fractional relationship, including as special cases multiple or sub-multiple relationships. In this sense the "occurrence at the same time, coincident" that defines "synchronism" has reference to the cyclic return to a condition of coincidence between certain peak values, which characterizes two waves which have such a relationship. The word "synchronism" includes the idea of isochronism, the latter not being limited to phase, but only to frequency, correspondence.

These and other objects more fully appearing hereinafter are realized in an arrangement in which the frequency of a vacuum tube oscillator is regulated by varying the capacity of a condenser forming a part of its frequency determining circuit, and in which a variation of frequency of the oscillator relative to the reference frequency causes a relative movement of the plates of the condenser and accordingly a variation of its capacity. This variation is made to be in a direction tending to restore the frequency of its initial relative value.

The important feature of the invention is the means for producing a relative movement of the condenser plates which is responsive, and proportional, to the relative change of frequency of the oscillators.

In the specific form illustrated, in which the reference source must be adapted to at least eventually produce an electric current, the only movement of the plates is a relative movement and this is made to depend on a difference in frequency and phase between the respective currents. A portion of the output currents from the two sources is impressed through a rectifier on a milli-ammeter, the pointer of which carries one plate of the condenser, the other being fixed. On account of the low mechanical frequency of the moving parts of the meter, they cannot respond to the variations of current from the individual oscillators. They can, however, respond to a sufficiently small beat frequency occurring between the frequencies of said oscillators. The area and relative adjustment of the plates of the condenser are such that an excursion of the pointer sufficiently varies the frequency of the oscillator to restore the frequency thereof to equality with the reference standard. The initial oscillation of the pointer accordingly reestablishes the initial frequency equality relation. Any subsequent tendency toward a relative change of frequency is met by a corresponding compensating variation of the variable capacity of the condenser.

By this arrangement, isochronism is attained. Since the deflection of the meter gives an indication of the phase difference between the currents, it is possible by the use of an auxiliary condenser to adjust the phases and attain both frequency and phase equality, that is, synchronism.

A better understanding of the nature and objects of the invention will be afforded by the following detailed description, together with the drawing, in which the single figure illustrates diagrammatically one species of the invention.

In the drawing oscillator O is the source whose frequency is to be regulated. Condenser 3 with condenser 5 constitutes a portion of the frequency determining circuit of oscillator O. The function of condenser 5 will be described later. $O_1$ indicates the reference frequency oscillator. It is the function of the system to maintain oscillator O in isochronous or synchronous relation, as the case may be, with oscillator $O_1$, even though the frequency of oscillator $O_1$ varies.

One plate of condenser 3 is fixed. The other plate is attached to the movable element of a milli-ammeter 6. The currents, or portions thereof, from the oscillators are impressed on the milli-ammeter through rectifier 7 which may be any device capable of producing a unidirectional current component from an alternating current. It may be, for example, a two-electrode vacuum tube. The rectifier current is capable, although of high impulse frequency, of actuating direct current meter, 6. The moving parts of the meter, however, have too great a natural period to enable the meter to reproduce the high frequency variations of either oscillator. It is able to follow the beat frequency variations when the beat frequency is sufficiently small. This beat frequency may measure directly the difference between the two frequencies as when the control is to be exercised to keep the frequencies equal. When the frequencies are not nearly equal but have nearly a rational fractional relationship, the beat frequency of course is of a different order. For example, if the two frequencies are 3000 and 7007 cycles per second, there will be a beat of one cycle per second. As by the means described below, these frequencies may be corrected and controlled at 3000 and 7000 cycles per second.

Under normal conditions, with the natural frequency of the meter relatively very small, the pointer will tend to oscillate when the beat frequency is of the order of a few cycles. With properly chosen impedances in the frequency determining circuit of the oscillator and with a properly adjusted input current in the meter, an excursion of the pointer will carry the capacity of condenser 3 through such a value as to give oscillator O a frequency which has a rational fractional relation with that of oscillator $O_1$. Accordingly, the first excursion of the pointer will tend to bring the oscillators to the stable condition of zero beat. The pointer will come to rest when this condition is attained. In a practical case the pointer will probably go through a short series of rapidly damped free mechanical vibrations before coming to rest at the equilibrium position.

If there is a subsequent tendency to produce a relative change of frequency as by a change in frequency of oscillator $O_1$, or a change in an impedance in the frequency determining circuit of oscillator O, the needle will move. If the condenser plates are arranged so that the capacity progressively changes in opposite senses in response to the respective movements in opposite directions of the movable plate, and so that the capacity is made to increase by a movement of the plate resulting from a relative increase in frequency of oscillator O, any tendency for the frequencies of the two oscillators to become different gives rise to a counter-force tending to restore them to their initial relative values and the pointer will move to an equilibrium position determined by the increase or decrease of capacity required to effect the required change in the frequency of O.

Any variation of deflection of the needle implies a change of phase between the two currents, assuming that the amplitudes of the currents remain constant. It would therefore appear, and this has been found to be true, that isochronism, but not synchronism, between the currents of the two oscillators may be attained with the circuits so far described. As the pointer moves back and forth to provide the necessary capacity changes in oscillator O, a variation of phase between the two currents is incidental to the adjustment necessary to preserve the equality of frequencies. As a matter of fact, a maximum deflection indicates that the two currents are in phase, a minimum deflection that they are 180° out of phase. If the amplitudes of the two currents are equal, the minimum deflection will be zero.

The means thus provided for accurately determining the threshold conditions of phase makes possible, by use of the condenser 5, the accurate phase adjustment of the two currents or, in other words, the attainment of synchronous operation. This condenser is a part of the frequency determining circuit of oscillator O. It is conveniently of relatively small capacity so that a large movement of its movable plate results in the pointer of the meter making a complete excursion. Its function may obviously, although less conveniently, be performed by a single condenser used jointly to perform this function and to provide the main frequency adjustment for the oscillator.

In operation, to bring the oscillators to synchronism when they are already in isochronism the capacity of condenser 5 is adjusted, the means above described all the time keeping the frequencies in isochronism, until there is a maximum deflection of the meter. The condition in which the pulses are 180° apart may be similarly obtained by causing the meter to have a minimum deflection. Any intermediate phase displacement other than zero may be obtained by causing the deflection to have any other corresponding value between maximum and minimum deflection, or if the maximum and minimum deflections have been noted, the variations of phase, as various conditions of isochronous operation of the two oscillators obtain, can be determined from the deflection.

Although no specific system in which the arrangement of the invention may be used is shown, many applications of the principle will readily occur to one skilled in the electrical arts. In multiplex carrier wave communication systems it is often required that the oscillators at one station or at different stations shall be operated isochronously or synchronously. It should be understood that the arrangement does not require that the oscillators be at any particular distance apart, and accordingly that the figure illustrates the case where the two oscillators may be at different stations as well as at the same station.

What is claimed is:

1. A frequency regulator comprising a source of periodic variations, a source of electrical periodic variations including a frequency determining condenser, means whereby a change of relative phase of the variations produced by said sources from any desired initial phase relation produces a change in capacity of said condenser, means whereby said change in capacity tends to produce a compensating change in said electrical source, and means for providing the desired initial phase relation between the variations from said sources.

2. A frequency regulator comprising a source of constant periodic variations, a source of alternating current including a condenser, said condenser forming part of a frequency determining circuit of said alternating current source, means for controlling the relative positions of the electrodes of the condenser in accordance with a relative change of phase of the variations from said sources, means for providing an initial equality of phase between the variations from said sources, and means whereby the control of the condenser electrodes by said sources automatically adjusts said capacity to maintain a frequency and phase equality relation between said sources.

3. Means to generate an alternating current of frequency and phase determined by a controlling alternating current in a given circuit, comprising a generator, a circuit, means to superpose the controlling electromotive force and the generator output electromotive force in said circuit, means to translate a relative change in phase of the two electromotive forces into a proportional change of electric current, and means directly responsive to such changed current and proportional thereto to govern the frequency and relative phase of the generator.

4. The method of regulating the frequency and phase of a wave from a vacuum tube oscillator having a frequency determining circuit including a condenser comprising a movable and a fixed electrode and a second variable condenser, relatively to the frequency and phase of a wave from a reference source, which comprises superposing effects of said waves, controlling a relative displacement of the plates of the first mentioned condenser in accordance with said superposed effects in such a manner as to tend to restore the waves to an initial equality frequency relation, said superposed effects being a function of the relative phase difference of said waves, and simultaneously varying said second condenser until the stable displacement of the plates of the first condenser is the proportion of the maximum relative excursion of said plates corresponding to the desired phase relation.

5. A frequency regulator comprising a periodic oscillator, a source of electrical oscillations including a variable condenser for phase adjustment, and a frequency determining device with a movable electrode actuated in accordance with a relative change of phase of the variations from said source and said oscillator to maintain them in frequency equality.

6. In combination, an oscillator including a frequency determining circuit, a variable condenser having relatively movable plates forming a part of said circuit, an electric controlling device having relatively movable parts, the extent of the relative movement being responsive to variations of phase of waves produced by said sources occurring slowly or rapidly, the plates of said condenser being unitarily mounted respectively on said relatively movable parts.

7. A circuit for regulating the frequency of one oscillator in response to the frequency of another oscillator comprising in combination, a controlled oscillator including a frequency determining circuit, a variable condenser having relatively movable plates forming a part of said circuit, a master oscillator, an electric meter, the moving parts of which have a relatively low period of mechanical vibration, and means for jointly impressing the currents from said oscillators on said meter, the plates on said condenser being respectively unitarily mounted on the movable and fixed portions of said meter.

8. A frequency regulator comprising a source of constant periodic variations, a source of alternating current including a condenser, said condenser forming part of a frequency determining circuit of said alternating current source, means for controlling the relative positions of the electrodes of the condenser in accordance with a relative change of phase of the variations from said sources, means for providing an initial equality of phase between the variations from said sources, and means whereby the control of the condenser electrodes by said sources automatically adjusts said condenser to maintain a rational fractional relationship between the frequency of the variations and the frequency of the alternating current.

9. A frequency regulator comprising a source of periodic variations, a source of electrical periodic variations including a frequency determining circuit, a reactor forming a part of said frequency determining circuit, and electro-mechanical means for controlling the reactance of said reactor, said means being directly responsive to a relative change of phase of the variations from said sources and adapted to affect a proportion variation of said reactance.

In witness whereof, I hereunto subscribe my name this 21 day of November, A. D., 1923.

FREDERICK S. BERNHARD.